United States Patent [19]

Shah et al.

[11] Patent Number: 5,962,134
[45] Date of Patent: Oct. 5, 1999

[54] AMINOPLAST- AND PHENOPLAST- RESIN ENCAPSULATED PARTICLES

[75] Inventors: Jayesh Shah; Alice M. Simon, both of Glen Burnie; Robin D. O'Dell, Pasadena, all of Md.

[73] Assignee: International Paper Company, Tuxedo, N.Y.

[21] Appl. No.: 08/877,816

[22] Filed: Jun. 18, 1997

Related U.S. Application Data

[60] Provisional application No. 60/016,113, Jun. 19, 1996.

[51] Int. Cl.$^6$ ................................................ B32B 5/16
[52] U.S. Cl. ................. 428/407; 427/213.3; 427/213.32; 427/215; 427/221; 524/401
[58] Field of Search ..................... 428/407, 327; 524/401, 80; 427/212, 213.3, 213.32, 215, 221

[56] References Cited

U.S. PATENT DOCUMENTS

| | | | |
|---|---|---|---|
| 2,119,189 | 5/1938 | Widmer | 134/58 |
| 3,303,168 | 2/1967 | Kazenas | 260/67.6 |
| 3,428,607 | 2/1969 | Renner | 528/232 |
| 3,454,529 | 7/1969 | Casebolt | 260/67.6 |
| 3,945,980 | 3/1976 | Tsubakimoto et al. | 524/843 |
| 4,206,095 | 6/1980 | Wynstra et al. | 528/137 |
| 4,694,905 | 9/1987 | Armbruster | 166/280 |
| 5,218,038 | 6/1993 | Johnson et al. | 524/541 |
| 5,246,616 | 9/1993 | Bito et al. | 525/163 |
| 5,344,704 | 9/1994 | O'Dell et al. | 428/323 |
| 5,422,193 | 6/1995 | Sinclair et al. | 428/403 |
| 5,425,994 | 6/1995 | Harry et al. | 428/403 |
| 5,545,476 | 8/1996 | O'Dell et al. | 428/327 |
| 5,728,797 | 3/1998 | O'Dell et al. | 528/120 |
| 5,760,104 | 6/1998 | Gerber | 523/145 |

FOREIGN PATENT DOCUMENTS

| | | |
|---|---|---|
| 2346383 | 10/1977 | France . |
| 1301007 | 12/1972 | United Kingdom . |
| 1321680 | 6/1973 | United Kingdom . |
| WO 92/11083 | 7/1992 | WIPO . |
| WO 97/07152 A1 | 2/1997 | WIPO . |

*Primary Examiner*—Hoa T. Le
*Attorney, Agent, or Firm*—Sheridan Neimark; Browdy and Neimark

[57] ABSTRACT

Aminoplast and phenoplast particles are obtained by providing an aqueous solution of such a resin having a water tolerance level, adding a particulate core-forming material in solid form, e.g. mineral particles or cured resin particles, as well as a mixture of water and a stabilizing agent, the amount of water being sufficient to exceed the water tolerance level of the aminoplast or phenoplast, and thus forming an emulsion or suspension of the resin coated particles in water, and advancing cure of the resin to form partially or fully cured resin coatings having a thickness preferably about 5–75 $\mu$m encapsulating the particulate core-forming material.

21 Claims, No Drawings

AMINOPLAST- AND PHENOPLAST- RESIN ENCAPSULATED PARTICLES

Priority is claimed under 35 U.S.C. 119(e) of the filing date of provisional application 60/016,113, filed Jun. 19, 1996.

FIELD OF INVENTION

The present invention relates to the encapsulation of particles, e.g. grit and/or colored particles, within initially water soluble resins to provide partially or fully cured resin shells about such particles, and more particularly to a method for making solid aminoplast and phenoplast resin shells encapsulating such particles and the resultant encapsulated particles, as well as products made therefrom.

BACKGROUND OF THE INVENTION

It is often desirable to make particles of partially cured or fully cured aminoplast and phenoplast resins such as melamine-formaldehyde resin, urea-formaldehyde resin and phenol-formaldehyde resin, commonly referred to respectively as melamine, urea and phenolic resins. These particles can be used as fillers either with or without inorganic fillers, and as molding powders. A particularly important use of such particulate materials, especially partially cured melamine resin particles, is in the manufacture of abrasion resistant aesthetic surface layer decorative laminates according to the O'Dell et al U.S. Pat. No. 5,344,704, which surface layer also desirably contains inorganic grit having a Moh hardness desirably greater than 6 or 7 in order to provide enhanced abrasion resistance.

Water-based thermosettable resins, e.g. aminoplast and phenoplast resins such as melamine resin, urea resin, and phenolic resin, have a characteristic which is sometimes known as "water tolerance". Thus, these aminoplast and phenoplast resins in the uncured state are water soluble, but when additional water is added beyond the so-called "water tolerance level", these resins begin to precipitate and form an oil-in-water emulsion or suspension, depending on the degree of cure. This known phenomenon is something which handlers of aminoplast and phenoplast resins have known of and have usually tried to avoid because it "ruined" the resin.

Thus, if sufficient water is added to such an aqueous thermosettable resin solution so as to exceed the water tolerance level and form an oil-in-water emulsion of the resin, and one then tries to advance the cure of the resin to partial or complete cure, the particles tend to coagulate and become agglomerated; and as the resin cures it forms large, hard rock-sized chunks of cured or partially cured resin which, unless these chunks can be ground to powder, are substantially useless.

A few workers in the field have attempted to use "water tolerance" to make thermosettable resin powders. Thus, the Renner et al U.S. Pat. No. 3,428,607 discloses the manufacture of melamine resin powders of less than 1 μm particle size by slowly adding the aqueous resin or resin precursor to water containing a protective colloid such as starch, gelatin, glue, gum tragacanth, agar-agar, carboxymethyl celluloses, alkaline metal alginates and water soluble polymers such as polyvinyl alcohol, polyvinyl pyrrolidone, alkali metal salts of polyacrylic acids, etc. at a concentration between 0.01% and 10%, the formation of the particles being carried out at a pH of 6–8 and preferably at the boiling temperature of the liquid. A very similar process is disclosed in the Tsubakimoto et al U.S. Pat. No. 3,945,980, in which the resin is a benzoguanamine resin. Insofar as is known, neither these methods nor the resultant products have achieved any degree of commercial success, and thus these methods are believed to have become abandoned.

In O'Dell et al, Ser. No. 08/516,738 now U.S. Pat. No. 5,728,797, an improved process is disclosed for obtaining phenoplast and aminoplast resins in particulate form. Insofar as is known, however, thermosettable resin powders in the form of shells encapsulating preformed organic or inorganic cores, e.g. grit, have not been proposed or produced. These core-in-shell powders would not only be advantageous in the preparation of molded resin products and intermediate-stage or "green" moldings in the production of ceramics, but would especially be useful in the manufacture of laminates in general and especially according to O'Dell et al U.S. Pat. No. 5,344,704 and O'Dell et al U.S. Pat. No. 5,545,476 to protect pressing plate dies against wear caused by the inorganic grit, and in the manufacture of particulate resin containing paper on a paper-making machine.

SUMMARY OF INVENTION

It is, accordingly, an object of the present invention to overcome deficiencies of the prior art, such as those indicated above.

It is another object of the present invention to provide for aminoplast and phenoplast resin particles, fully or partially cured, having a core which may be organic, inorganic or both, and of a selected and uniform size, in an inexpensive and reliable manner.

It is a further object of the present invention to provide an improved method for making good quality fully or partially cured particles of aminoplast and phenoplast resins such as melamine resin, urea resin and phenolic resin, having an inorganic core and especially of wear resistant hard mineral such as alumina.

It is still another object of the present invention to provide colored particles having a colored core surrounded by a transparent shell, whereby such particles can be used to form laminates and molded products having certain previously difficult-to-achieve appearances, including a three dimensional appearance in a flat surface by having colored particles appear to float within the surface of a molded product or laminate rather than sitting flat on top.

The above and other objects of the present invention are achieved by a two- or three-step wet process which consists essentially of (1) optionally first partially curing an aqueous solution of the selected aminoplast or phenoplast resin to a desired degree of cure, (2) then adding a mixture of water, preformed particles, e.g. grit, and either a protective colloid or more preferably a water-insoluble stabilizing agent, namely microcrystalline cellulose or the like, or a mixture of a protective colloid and water-insoluble stabilizing agent, to the uncured or partially cured aqueous resin solution, to cause the aqueous resin solution to form a stabilized emulsion or suspension of discrete particles having a grit or other preformed particle core, and (3) then beginning or continuing curing of the stabilized emulsion or dispersion to obtain particles advanced to the desired degree of cure.

The above objects and the nature and advantages of the present invention will be apparent from the following detailed description of embodiments.

DETAILED DESCRIPTION OF EMBODIMENTS

The present invention is hereinafter described in terms of the manufacture of melamine-formaldehyde resin, hereinafter simply "melamine resin", particles containing hard mineral or preformed resin particle cores, but it will be understood that the same process is applicable to other types of particulate cores and to other thermosettable resins which are water soluble in the uncured state and have the "water tolerance" characteristic, including urea, phenolic, dicyandiamide, modified melamine resins and other aminotriazine resins including those disclosed in the aforementioned Renner and Tsubakimoto patents, etc. The solids content of the uncured aqueous resin starting solution is not critical, but a starting solution of 50–70% of solids is preferred.

In general, the state of cure during curing by heating of aqueous melamine resin is measured by a determination of water tolerance[1], and water tolerance (W/T) of the resin decreases as the state of cure of the resin increases. Typically, the hot resin water tolerance of an aqueous, uncured melamine resin is 1.5 units; after cooking the aqueous melamine resin at the boiling point of water for a given period of time to advance the degree of cure, the water tolerance will drop to a lower value, e.g. a hot resin W/T of 0.4 units.

[1] Water tolerance (WT) is usually determined as follows:

Measure the amount water (ml) required at 25° C. to precipitate 10 gm of melamine resin at 25° C. This amount divided by 10 gives the units of water tolerance of the given resin. In some cases water tolerance is also measured in %, in which the amount of water required to precipitate melamine resin is multiplied by 10.

For purposes of the present invention, water tolerance is determined as follows:

Measure the amount water (ml) required at 25° C. to precipitate 10 gm of hot melamine resin [hot resin as it comes out of the reactor at 100° C.] This amount divided by 10 gives the units of water tolerance for given resin. This type of water tolerance, hereinafter sometimes called "hot resin water tolerance" gives higher water tolerance values of the resin, e.g. if melamine resin at 25° C. indicates 0 water tolerance, then under hot condition it will show a water tolerance of approximate 0.75–1.2 units.

To exercise control of the process in order to obtain the desired particulate product, it is necessary to measure the state of cure of the resin. This is accomplished by differential scanning calorimetry (hereinafter "DSC") which measures the residual energy remaining in the resin, and thus gives a measure of the remaining degree of cure which is possible. Again using the example of melamine resin, the initial aqueous solution of uncured resin has a DSC of 80 J/g. After approximately two hours of cooking at 100° C., it has a DSC of 50 J/g. After cooking for approximately eight hours at 100° C., it has a DSC of 5 J/g, and after cooking for ten hours at 100° C. it is fully cured and has a DSC of 0 J/g.

As indicated above, if water is added to the aqueous resin without a protective colloid or more preferably a water-insoluble stabilizing agent such as microcrystalline cellulose being present, the emulsion is unstable and as it cures, e.g. by cooking, it agglomerates and forms large rock-sized chunks. In accordance with the present invention, this problem is obviated by the use of a protective colloid, e.g. as disclosed in the aforementioned Renner and Tsubakimoto patents, or preferably and better by use of an appropriate water-insoluble stabilizing agent such as microcrystalline cellulose which is commercially available in the form of Avicel™, a composition of about 85–90% microcrystalline cellulose and 10–15% carboxymethyl cellulose, as disclosed in O'Dell et al Ser. No. 08/516,738, the contents of which are hereby incorporated by reference.

Selection of an appropriate stabilizing agent is crucial to the success of the present invention, and it has been found that in general surfactants are not suitable because during cooking they cause changes in surface energy which in turn cause foaming and wetting problems, the undesirable effects of which would need to be cancelled out by the use of various counteracting materials. Protective colloids such as carboxymethyl cellulose and PVA work only poorly, and their use requires the resin solution to be added to the colloid solution rather than vice versa. Microcrystalline cellulose, such as in the form of Avicel™, is the preferred water-insoluble stabilizing agent.

The quantity of Avicel™ preferably used according to the present invention falls within a very narrow range of about 0.6% to about 3%, and is most preferably about 1.2%, based on the quantity (dry solids) of resin in the aqueous solution. Less than 0.3% of Avicel™ does not always reliably produce the cured or partially cured resin in particulate form, i.e. a minimum of as low as 0.3% of the Avicel™ can produce a reliably stabilizing effect. The upper limit is based on practical considerations, because more than about 3% Avicel™ produces an unduly high viscosity in the solution, and also begins to make the resultant fully cured or partially cured melamine particles hazy and therefore less suitable for use in the process for making abrasion resistant laminate according to O'Dell et al U.S. Pat. No. 5,344,704, although such particles can be used for other purposes, such as molding powder, filler, etc.

As indicated above, the process of the present invention is basically a two- or three-step process in which the liquid melamine resin is optionally and preferably first cooked to a desired degree of cure, then a mixture of water, grit or other preformed particles, e.g. preformed colored resin particles, and preferably water insoluble stabilizing agent, most preferably Avicel™, is added to form a stabilized emulsion or dispersion of discrete core-in-shell particles. In the third step, the cure is continued by further cooking so as to obtain discrete particles of a given mean particle size. The pH of the resin solution is not critical and may be within the range of 3 to 11 or even more, but is preferably pH 9–11. The speed of the process can be increased by the use of higher than atmospheric pressure.

The length of time of the optional first step, i.e. the initial curing before addition of (1) the core particles, (2) the water-insoluble stabilizing agent and (3) excess water to exceed the water tolerance level, is what determines the thickness of the shell of the resultant fully cured or partially cured resin shells. In practice, the first step is optional because it may be entirely eliminated, thus changing the three-step process to a two-step process, i.e. the water, the grit or other preformed core particles and stabilizing agent may be added immediately to the aqueous resin solution before it has undergone any advancement of cure of the resin whatsoever, in which case the particles produced will be of minimum size, effectively determined by the size of the grit or other particles. The size produced is in large part dictated by the intended use, and is controlled as indicated above by the degree of initial cure and the size of the core particles. For use in the decorative laminate of O'Dell et al U.S. Pat. No. 5,344,704, it is preferred that the relative quantities of melamine resin and core particles be so selected that the core particles have a loading of a maximum of about 50% by weight based on the melamine resin solids and/or that the shells have a thickness of about 5 to 75 $\mu$m, and most preferably about 30 to 40 $\mu$m.

The nature of the particles which form the core is subject to wide variation, depending on the intended use of the final core-in-shell particles. For molding powders, the core particles can be any conventional filler of known particle size typical for such use. For purposes of making decorative laminate, two types of core particles are preferred, namely (1) so-called "grit", preferably inorganic particles of a mean particle size of approximately 10–50 µm having a Moh hardness preferably greater than 6, most preferably alumina or a mixture of alumina and silica, and (2) preformed cured resin particles of for example 20–150 µm particle size formed of any of a wide variety of preferably fully cured resins running from polyesters and epoxies to phenoplasts and aminoplasts, but most preferably melamine resin itself.

While the examples below disclose curing of the resin by heating, curing can alternatively be effected by use of a catalyst or curing agent, or by heating in the presence of a catalyst or curing agent which can be added to the aqueous resin along with the water/stabilizing agent/core material mixture.

The following examples are offered illustratively:

EXAMPLE 1

A commercial melamine formaldehyde resin solution is cooked up to a water tolerance of 150–0. Water, alumina particles and Avicel™ slurry are added to the initially cooked resin solution, and cooking is continued until the desired level of cured melamine particle shells surrounding the alumina grit particles is achieved. In this run, particles are removed at three different times, the third removal providing fully cured melamine resin shells surrounding the alumina particles.

In each case, the particles are dried and inspected under the microscope. In each case, the microscope reveals particles encapsulated by a generally spherical shell of melamine resin.

EXAMPLE 2

The process or Example 1 is repeated, except that instead of adding the alumina particles to the resin as part of the Avicel™ slurry, the alumina particles are added to the resin solution separately. The results are the same.

EXAMPLE 3

Ten pounds of a commercial melamine formaldehyde resin solution at 1.5% water tolerance are mixed with 5 grams of blue colored fully cured melamine resin particles for two minutes. The above mix is then cooked at 210° F. until the water tolerance drops to 0.5%. At this time, a water/Avicel™ slurry is added to the above mix, comprising 10 lbs. of water and 32.7 grams of Avicel™. Cooking is continued for an additional time to provide a total of 10 hours of cooking. The particles are removed, dried and inspected under the microscope, and show an encapsulation of the blue particles with a shell wall of substantial thickness of fully cured clear melamine resin.

EXAMPLE 4

Ten pounds of melamine resin are cooked to water tolerance of 0.5%. A mixture of 10 lbs. of water, 32.7 grams of Avicel™ and 5 grams of blue cured melamine resin particles are then added and cooking is continued for ten hours. The particles are then removed, dried and evaluated, showing encapsulation of the blue particles with shell walls of fully cured clear melamine resin substantially thinner than the walls of the encapsulated particles of Example 3.

EXAMPLE 5

Dark blue, fully cured melamine particles are produced according to the method of O'Dell et al Ser. No. 08/516,738. The dark blue particles are graded and separated for size to obtain those having a size greater than 75 µm. Five pounds of melamine formaldehyde solution and 5 grams of such fully cured dark blue particles are then mixed for two minutes. A slurry of 32.7 grams of Avicel™ and 10 lbs. of water is formed by mixing for 15 minutes. The melamine solution containing the blue fully cured melamine particles is cooked until it forms particles when dripped into cold water. The water/Avicel™ slurry is then added to the melamine solution containing the blue particles and cooking is continued for a total of 10 hours. The resultant mixture is filtered and the resultant particles are dried. A microscopic evaluation shows dark blue particles encapsulated by a transparent melamine coating of substantial thickness.

EXAMPLE 6

Particles produced according to Example 5 are used to make laminate in accordance with O'Dell et al U.S. Pat. No. 5,344,704. The resultant laminate has a deep blue color, but the color appears to lie below the surface of the laminate.

EXAMPLE 7

Encapsulated alumina grit made according to Example 1 above is used to make a decorative laminate according to O'Dell et al U.S. Pat. No. 5,344,704. Plate wear is reduced because the grit is encapsulated and does not scratch the pressing plate die.

EXAMPLE 8

Ten pounds of commercial melamine formaldehyde solution is cooked to a water tolerance of 0.05. To this liquid is added a slurry of 10 lbs. of water, 32.7 g of Avicel™, 20 g of red/pinkish fully cured melamine resin particles of 50 µm mean particle size and 30 g of alumina particles of 30 µm mean particle size. The resultant slurry is heated until the coated particles precipitate. The liquid is filtered off, the mixed particles are dried and then used in the manufacture of decorative laminate according to O'Dell et al U.S. Pat. No. 5,344,704.

EXAMPLE 9

Example 3 is repeated except that the quantity of Avicel™ used is reduced to 26.6 grams, which corresponds to about 0.9% by weight of the melamine resin solids. Results are the same.

EXAMPLE 10

Example 4 is repeated, except that like Example 9 the quantity of Avicel™ used is reduced to 26.6 grams. The results are the same as in Example 4.

EXAMPLE 11

The process of Example 3 is repeated, except that the quantity of the blue colored fully cured melamine resin particles is increased to 50 grams, which is about 1.7% by weight of the melamine resin solids. The results are generally the same as in Example 3.

EXAMPLE 12

The process of Example 4 is repeated except that, like Example 11, the quantity of blue colored fully cured resin particles is increased to 50 grams. The results are the same as in Example 11.

EXAMPLE 13

The process of Example 5 is repeated, except that the fully cured blue resin particles are used in an amount of 50 grams instead of 5 grams, the 50 grams corresponding to about 3.4% of the melamine resin solids. The results are generally the same as in Example 5.

EXAMPLE 14

The process of Example 5 is repeated, except that the quantity of Avicel™ is decreased to 17.7 grams corresponding to about 1.2% by weight of the melamine resin solids. The results are the same.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. For example, additives may also be present, such as those set forth in the aforementioned Renner U.S. patent including starch and/or gelatin and/or also fumed silica, but the quantity of such additives should not be so great as to increase the viscosity of the resin solution to greater than the viscosity of a resin solution containing 3% microcrystalline cellulose. The means and materials for carrying out various disclosed functions may take a variety of alternative forms without departing from the invention. It is to be understood that the phraseology or terminology employed herein is for the purpose of description and not of limitation.

The expressions "means to . . . " and "means for . . . " as may be found in the specification above and/or in the claims below, followed by a functional statement, are intended to define and cover whatever structural, physical, chemical or electrical element or structure may now or in the future exist for carrying out the recited function, whether or not precisely equivalent to the embodiment or embodiments disclosed in the specification above, i.e. other means for carrying out the same function can be used; and it is intended that such expressions be given their broadest interpretation.

What is claimed is:

1. Resin encapsulated particles, each said particle comprising a core and a coating thereover, said core being solid and being selected from the group consisting of an inorganic material and a resin, said coating comprising a partially cured or fully cured aminoplast or phenoplast resin having water tolerance.

2. A method of making aminoplast or phenoplast coated particles comprising providing an aqueous solution of an aminoplast or phenoplast resin having a water tolerance level, adding core-forming particles and a protective colloid, a water-insoluble stabilizing agent, or mixture thereof together with an amount of water sufficient to exceed the water tolerance level of said resin and thus form uncured or partially cured resin coating over said core-forming particles in water, and advancing cure of said uncured or partially cured resin to form partially or fully cured resin coatings having a thickness of 5 to 75 $\mu$m encapsulating said particulate core-forming particles.

3. A method of making cured aminoplast or phenoplast particles comprising providing an aqueous solution of an aminoplast or phenoplast resin having a water tolerance level, adding a particulate core-forming material and a mixture of water and a water-insoluble stabilizing agent to exceed the water tolerance level of said resin and thus form an emulsion or suspension of resin particles in water, and advancing cure of said resin to form partially or fully cured resin coatings encapsulating said particulate core-forming material.

4. A method according to claim 3 wherein said advancing of cure is done by heating.

5. A method according to claim 4 wherein said advancing of cure is carried out at higher than atmospheric pressure.

6. A method according to claim 3 wherein said water-insoluble stabilizing agent is microcrystalline cellulose.

7. A method according to claim 6 wherein said resin is melamine resin.

8. A method according to claim 7 wherein said advancing of cure is done by heating.

9. A method according to claim 3 wherein prior to said mixing step, said resin solution is subjected to partial curing.

10. A method according to claim 3 wherein said resin is melamine resin.

11. A method according to claim 3 wherein said particulate core-forming material comprises inorganic particles.

12. A method according to claim 11 wherein said inorganic particles comprise abrasion resistant particles having a Moh hardness of greater than 6.

13. A method according to claim 12 wherein said particles have a mean particle core size of 10–50 $\mu$.

14. Resin encapsulated particles made by the method of claim 13.

15. A method according to claim 3 wherein said particulate core-forming material comprises cured resin particles.

16. A method according to claim 15 wherein said cured resin particles are colored.

17. Resin encapsulated particles made by the method of claim 16.

18. A method according to claim 15 wherein said resin particles have a mean particle core size of 20–150 $\mu$m.

19. Resin encapsulated particles made by the method of claim 18.

20. Resin encapsulated particles made by the method of claim 3.

21. In an abrasion resistant high pressure decorative laminate comprising a core, a decorative layer above said core, and a substantially transparent protective layer over said decorative layer, the improvement wherein said protective layer comprises resin encapsulated particles according to claim 20.

* * * * *